Patented Nov. 17, 1931

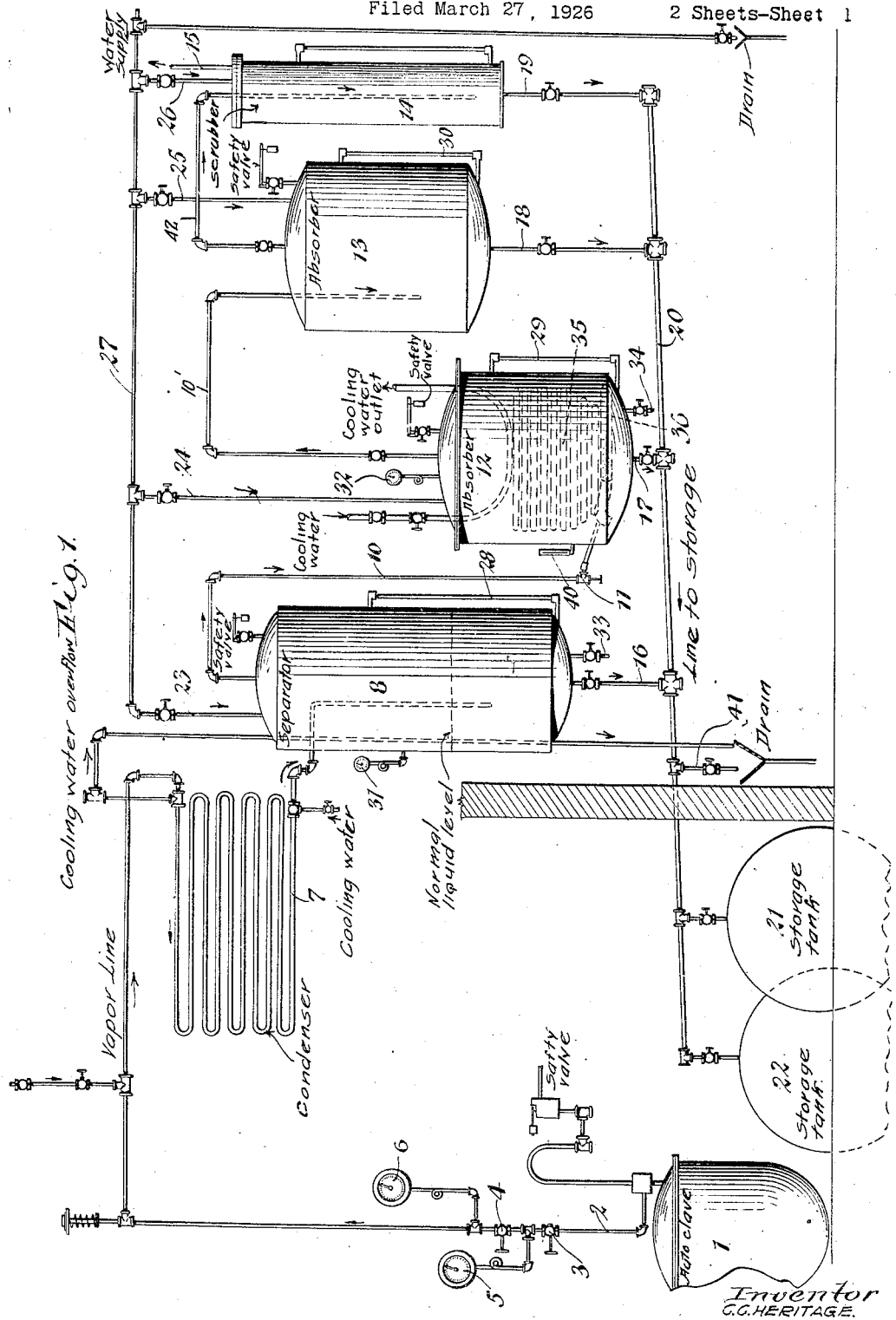

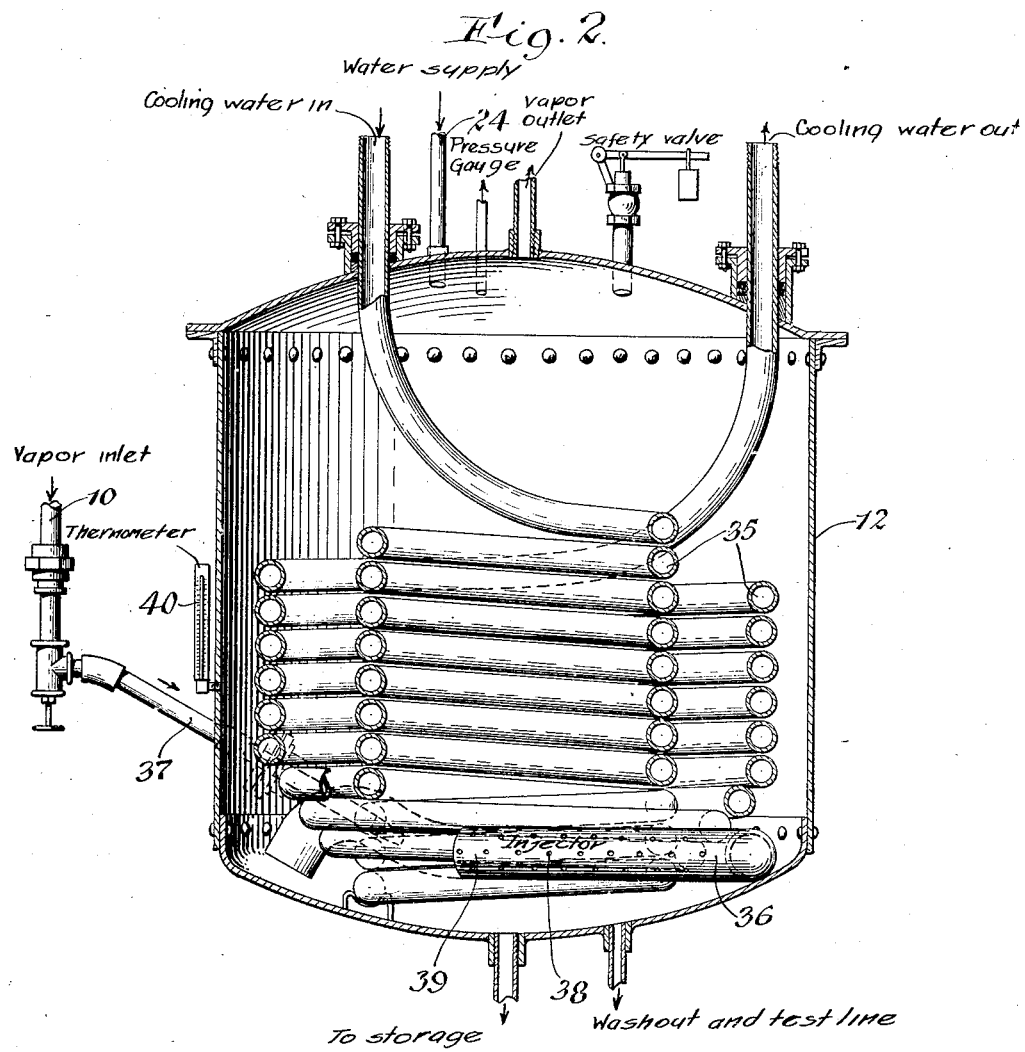

1,832,485

UNITED STATES PATENT OFFICE

CLARK C. HERITAGE AND IRVING T. THORNTON, OF BUFFALO, NEW YORK, ASSIGNORS TO NATIONAL ANILINE & CHEMICAL CO., INC., OF NEW YORK, N. Y., A CORPORATION OF NEW YORK

AMMONIA RECOVERY

Application filed March 27, 1926. Serial No. 97,983.

This invention relates to the recovery of substances which are removed from a reaction zone in a gaseous condition and, in its specific application relates to the recovery of ammonia from gaseous mixtures containing the same under variable conditions of pressure, temperature and strength.

In the manufacture of certain chemical products, a reaction mixture including ammonia in excess is heated in a closed vessel under pressure. In practical operation, it is economically essential that the excess ammonia, remaining in the reaction vessel after completion of the reaction, be recovered and reused. The recovery of the ammonia is effected, according to common practice, by passing the portion of the reaction mixture which is in the vapor phase into an absorption tower containing water. The ammonia is absorbed by the water, but owing to the varying content of steam and ammonia in the reaction mixture and the variation in the pressure and temperature conditions as the pressure in the autoclave falls, the absorption is irregular and the concentration of the resulting ammonia liquor cannot be controlled. It is desirable, however, when employing unskilled labor for recharging the autoclave for subsequent operation, that there always be used an aqueous ammonia of a particular strength; and so, in practice, the aqueous solution obtained by absorption is distilled and rectified.

According to the present invention, a process and apparatus are provided whereby conditions created during the reaction are utilized in effecting the recovery of the ammonia, thereby avoiding the cumbersome apparatus and the expense attached to the customary procedure. The invention further includes the provision of a process and apparatus for controlling the strength of the ammonia recovered irrespective of the reaction conditions.

In the practice of the present invention for the recovery of gaseous products contained in a reaction mixture under superatmospheric pressure, the pressure of that portion of the reaction mixture which is in the vapor phase is reduced, the portion is then cooled to produce a condensate, the uncondensed residue is separated from the condensate, and gaseous products are absorbed from said uncondensed residue in a liquid medium, while maintaining said medium under fixed temperature and pressure conditions.

In the accompanying drawings

Fig. 1 shows diagrammatically an apparatus for carrying out the process of the invention; and Fig. 2 is a section of a solution tank.

An autoclave 1 has a vapor line 2 extending from it with needle valves 3, 4 and associated pressure gages 5, 6 to regulate the pressure of the escaping gases. The vapor line 3 is connected to a cooling coil or condenser 7 and this in turn opens into a separating tank 8 below a normal liquid level maintained therein.

A pipe line 10, provided with a needle valve 11, leads from tank 8, at a point above the normal liquid level in said tank, to the bottom of a solution tank or absorber 12. A pipe line 10' leads from the first absorber to a second solution tank or absorber 13, which is connected by a line 42 to the bottom of a tower 14 having a vent 15 to the atmosphere. The solution tanks or absorbers 12 and 13, and the tower 14 contain water or other liquid.

Each of the tanks 12 and 13 and the tower 14 have valve controlled bottom outlets, 16, 17, 18, 19, respectively, connected to a common main 20, which is inclined so as to drain into containers or storage tank 21 and 22. They also have valve controlled top inlets, 23, 24, 25, 26, respectively, connected to a common water or liquid header 27. The second solution tank 13 is at a higher level than the first, so that it may be emptied into the latter, while the tower 14 is preferably at about the same level with the second solution tank. The tanks are equipped with gage glasses 28, 29, 30, respectively. The separation tank and the first solution tank 12 have pressure gages 31, 32 and are further provided with samplers 33, 34. The separator and absorbers are also each provided with a safety valve.

The first absorber or solution tank 12 is shown in section in Fig. 2. Within the tank there is a double cooling coil 35. Around the bottom there is a partial turn 36 of a large diameter pipe into or near one end of which there extends the terminal 37 of the gas admission line 10 thus forming an injector. Perforations 38 near the outlet end 39 cause a diffusion of the gases and entrained liquid throughout the mass of liquid within the tank. A thermometer 40 is inserted in the tank to indicate temperatures.

In carrying out the process of the invention in connection with the apparatus described, a mixture of vapor and gases is contained under high pressure in the pressure vessel 1. Needle valves 3 and 4 are then opened, permitting a stream of the mixture to flow into the condenser 7. The expansion of the mixture in its passage through the needle valves from the high pressure in the container to the lower, though still elevated, pressure in the condenser results in a decided cooling of the mixture. This cooling, assisted by the cooling action of the condenser and the pressure retained on the mixture, results in the ready liquefaction of the condensible vapors, such as steam, in the passage of the mixture through the condenser. The cooled mixture, containing the condensate, then passes into separator 8 where the condensate is trapped, and the dried or separated gases flow through line 10 and needle valve 11 into the solution tank or absorber 12, which is partially filled with absorbing liquid.

In passing through the needle valve 11, the gases are further expanded to a lower, though still elevated, pressure and cooled. The gases are absorbed in the absorbing liquid in the solution tank 12, the injector action produced by the gases in entering the tank 12 resulting in thorough intermixture of the gas and absorbing liquid. Heat liberated by the absorption is removed by the cooling coil 35. Unabsorbed gases then pass through line 10' into the second absorber 13, where an additional portion of the gases is absorbed. The second absorber 13 is preferably partially filled with an absorbing liquid similar to that in tank 12, the extent to which it is filled being dependent upon the pressure desired to be maintained on the exit gases in the first absorber 12. Residual gases are scrubbed in tower 14.

This process affords a means of directly obtaining a solution of the gas in the absorbing liquid having a particular concentration of dissolved gas. By removing condensible material as a separate stage of the process and then absorbing the gas which has been freed from condensible material, it becomes possible to control the concentration of the absorbed gas in the solution by a mere control of the temperature and pressure conditions in the solution tank, inasmuch as a liquid will absorb only a fixed amount of a particular gas under fixed conditions of partial pressure of the gas and temperature.

The following specific example, illustrative of the process and the apparatus of the present invention, describes their use in connection with the manufacture of betaminoanthraquinone.

Example: The autoclave is charged with aqua ammonia of about 28% strength to which is added copper sulfate and chlor-anthraquinone. It is then closed and heated to about 200° C. and maintained at this temperature for the necessary reaction period; the pressure rises to about 800 or 850 pounds per square inch. At the end of the reaction the gaseous constituents of the reaction mixture are gradually released by means of the needle valves 3, 4 and allowed to expand to a pressure of about 50 pounds per square inch. The expansion causes a considerable drop in temperature, and heat is eliminated as the gaseous products flow through the cooling coil 7, resulting in a concentrated ammonia condensate. The condensate remains substantially in the separator 8. The dried or separated gases pass from the separator 8 to the first solution tank or absorber 12, and are further expanded to a pressure of about 5 pounds per square inch in their passage through the needle valve 11, thus being further cooled. Sufficient pressure is maintained on the gases to give a desired velocity and an injector action in the first solution tank or absorber 12 which is preferably charged with a measured quantity of water. Water is drawn by the injector through the pipe 36 in contact with the ammonia in the gases, and the ammonia-water mixture is diffused into the balance of the water. The ammonia absorption releases heat which is removed by the cooling coil 35, a sufficient amount of cooling medium being circulated through the coil to maintain a desired temperature commensurate with the concentration of aqua ammonia that is desired; thus a temperature of 35° C. or thereabouts with a proper charge of water and a pressure on the entering ammonia of about 5 pounds per square inch gives an aqua ammonia of about 28% concentration. Unabsorbed gases pass through line 10' into the second solution tank or absorber 13 which is nominally at atmospheric pressure; and what gas escapes from this tank passes through the liquid in the tower 14 and out of the vent 15. The second solution tank has a charge of water preferably equal to that in the first so that the latter can be filled from the former, and enough water is charged into the tower 14 to insure a liquid seal for the inlet pipe and substantial absorption of any traces of ammonia.

As the pressure of that portion of the reaction mixture which is in the vapor phase is reduced, the vapor phase is augmented by gaseous constituents which are released from the vapor phase, and the proportion of steam in the gases increases while the proportion of ammonia decreases. This is indicated by the rising level of water in the separation tank and the decreased flow of ammonia into the first absorber; but as the condensate is trapped in the separation tank, it does not dilute the aqua ammonia formed in the absorber. Consequently, the absorber can be charged with a definite amount of water corresponding to the amount of ammonia given off during the reaction; and an aqueous ammonia solution of the desired strength can be obtained in the solution tank by regulating the temperature and pressure conditions to correspond with equilibrium conditions of aqueous ammonia of said strength.

When the recovery of ammonia is finished, the tanks may be sampled and concentrated liquor from the separation tank and solution from the absorber allowed to escape in proportions to give the desired strength to be collected in the containers 21, 22. When this has been accomplished the valves to the containers are closed, the outlet to the separation tank is closed and the second solution tank is drained into the first. The first solution tank outlet is then closed and the second solution tank is filled from the tower and supplied with any necessary additional water. Thereupon the bottom outlets to the second solution tank and tower are closed and the apparatus is ready for a second run, following the discharge of the autoclave and recharging of the latter. Prior to preparing the tanks for a second run, any excess in the tanks can be drained into the sewer line 41. The aqua ammonia thus collected in the containers 21, 22 is ready for use in the autoclave reaction without any further treatment.

The expansion of the gaseous products through the needle valves from the high pressures in the autoclave results in a decided cooling of these products so that condensible vapors, such as steam, readily become liquid in traveling through the condenser. This liquefaction is further accelerated by the pressure retained on the gases. The pressure also results in an increased absorption of ammonia by the condensate, giving an aqua ammonia of high concentration. Accordingly in the condensation step no liquid is added, and heat abstraction and pressure alone are agencies for obtaining the concentrated condensate.

Further cooling follows from the expansion into the first absorber or solution tank. A high velocity of the gases also results, and in passing through the injector, the liquid in the absorber is drawn in, and intimate contact of gas and liquid is obtained. The liquid and absorbed gases rise to the top and in so doing pass over the cooling coils which remove the heat of absorption.

While the gas expansions are secured by reductions of a high initial pressure, other pressures or a partial vacuum on the end of the system can be used for this purpose. Furthermore the degree to which such expansions occur depends on the relative pressures, and these can be controlled or varied in accordance with the products desired.

Though the invention is primarily directed to ammonia recovery, its application to the recovery of other products of a similar nature is evident. Consequently it is not to be interpreted as restricted to the specific example given but is to be given a scope commensurate with the appended claims.

What is claimed is:

1. The process of recovering gaseous and liquid products from a chemical reaction mixture, which comprises reducing the pressure of that portion of the reaction mixture which is in the vapor phase, cooling said portion to produce a condensate, separating the uncondensed residue from the condensate, further reducing the pressure of the uncondensed residue and absorbing products from said uncondensed residue in a liquid medium, until a predetermined fixed pressure to which the liquid medium is subjected is reached, whereby a solution of fixed concentration is formed.

2. The process of recovering gaseous and liquid products from a chemical reaction mixture containing the same under superatmospheric pressure, which comprises reducing the pressure of that portion of the reaction mixture which is in the vapor phase, cooling said portion to produce a condensate, separating the uncondensed residue from the condensate, further reducing the pressure of said uncondensed residue, and absorbing gaseous products therefrom in a liquid medium, while maintaining said medium under temperature and pressure conditions corresponding with equilibrium conditions of a solution of fixed concentration of said gas in said medium.

3. The process of recovering ammonia from a reaction mixture which contains ammonia gas and water vapor, which comprises reducing the pressure of that portion of the reaction mixture which is in the vapor phase, cooling said portion to condense water vapor, separating the uncondensed residue from the condensate, further reducing the pressure of the uncondensed residue and passing said residue into an aqueous absorbing medium, until a predetermined fixed pressure to which the liquid medium is subjected is reached, whereby a solution of fixed concentration is formed.

4. The process of recovering ammonia from a reaction mixture which contains ammonia gas and water vapor under superatmospheric pressure, which comprises expanding that portion of the reaction mixture including ammonia gas and water vapor which is in the vapor phase, cooling said portion to condense substantially all water vapor contained therein, separating the uncondensed residue from the condensate, including ammonia gas and passing said residue including the ammonia gas into an aqueous absorbing medium, until a predetermined fixed pressure to which the liquid medium is subjected is reached to form an ammonia solution of fixed concentration.

5. A process which comprises chemically reacting reagents including aqueous ammonia of a fixed concentration to form a reaction mixture under superatmospheric pressure and comprising gaseous products including ammonia, reducing the pressure of said gaseous products, cooling said products to form a condensate, separating the condensate from the uncondensed residue, absorbing ammonia from said uncondensed residue in an aqueous medium while maintaining said medium under temperature and pressure conditions corresponding with the equilibrium conditions of an aqueous ammonia of substantially the concentration originally employed, and repeating the reaction with said ammonia as a reagent.

6. A process which comprises chemically reacting reagents including an aqueous ammonia solution of about 28 per cent. strength to form a reaction mixture under a pressure greater than about 50 lbs. per square inch and comprising gaseous products including ammonia and water vapor, reducing the pressure of said gaseous products to about 50 lbs. per square inch, cooling said products to condense water vapor, separating residual uncondensed products from the condensate, reducing the pressure of said uncondensed products to about 5 lbs. per square inch, absorbing ammonia from said uncondensed products in an aqueous medium, while maintaining said medium at a temperature of about 35° C. and at a pressure of about 5 lbs. per square inch to produce an aqueous ammonia solution of about 28 per cent. strength, and repeating the reaction with said ammonia as a reagent.

7. Apparatus for recovering gaseous products of a reaction, comprising in combination means for reducing the pressure of a gaseous mixture, said means being adapted to be connected to a reaction vessel, a condenser connected to said means, means for trapping condensate connected to said condenser, and absorbing means connected to said latter means.

8. Apparatus for recovering gaseous products of a reaction, comprising in combination means for reducing the pressure of a gaseous mixture, said means being adapted to be connected to a reaction vessel, a condenser connected to said means, means for trapping condensate connected to said condenser, pressure reducing means connected to said trapping means, and absorbing means connected to said latter pressure reducing means.

9. Apparatus for recovering gaseous products of a reaction, comprising in combination a pressure reducing valve, said valve being adapted to be connected to a reaction vessel, a condenser connected to said valve, a trap for condensate connected to said condenser, pressure reducing means connected to said trap, an absorber connected to said means, and a cooler for said absorber.

10. Apparatus for producing aqua ammonia of a definite concentration from a gaseous mixture containing ammonia under pressure, comprising in combination means for expanding said mixture, said means being adapted to be connected to the container of said mixture, means for condensing vapors contained in said expanded mixture, means for removing condensed vapors from said expanded mixture, means for absorbing ammonia from said expanded mixture, and means for controlling the temperature and pressure in said absorber.

11. Apparatus for producing aqua ammonia of a definite concentration from a gaseous mixture containing ammonia under pressure, comprising in combination means for expanding said mixture, said means being adapted to be connected to the container of said mixture, means for condensing vapors contained in said expanded mixture, means for removing condensed vapors from said expanded mixture, means for further expanding the residual gases, means for absorbing ammonia from said gases, and means for controlling the temperature and pressure in said absorber.

12. Apparatus for producing aqua ammonia of a definite concentration from a gaseous mixture containing ammonia under pressure, comprising in combination a pressure reducing valve, said valve being adapted to be connected to the container of the gaseous mixture, a condenser connected to said valve, a separator for removing liquid condensate connected to said condenser and having a gas outlet, an absorber connected to said outlet, a cooler for said absorber, and means for regulating the pressure in said absorber.

13. Apparatus for producing aqua ammonia of a definite concentration from a gaseous mixture containing ammonia under pressure, comprising in combination a pressure reducing valve, said valve being adapted to be connected to the container of the gaseous mixture, a condenser connected to said valve, a separator for removing liquid condensate connected to said condenser and having a gas outlet, an absorber, a pressure reducing valve connecting said absorber to said outlet, a cooler for said absorber, and means for regulating the pressure in said absorber.

In testimony whereof we affix our signatures.

CLARK C. HERITAGE.
IRVING T. THORNTON.

CERTIFICATE OF CORRECTION.

Patent No. 1,832,485.                  Granted November 17, 1931, to

CLARK C. HERITAGE ET AL.

It is hereby certified that error appears in the printed specification of the above numbered patent requiring correction as follows: Page 1, line 66, for the numeral "3" read 2; page 4, lines 13 and 14, claim 4, strike out the words "including ammonia gas" and insert including the ammonia gas to follow "residue" in line 13, of same claim; and that the said Letters Patent should be read with these corrections therein that the same may conform to the record of the case in the Patent Office.

Signed and sealed this 22nd day of December, A. D. 1931.

(Seal)                                                                 M. J. Moore,
                                                                       Acting Commissioner of Patents.